Patented May 29, 1923.

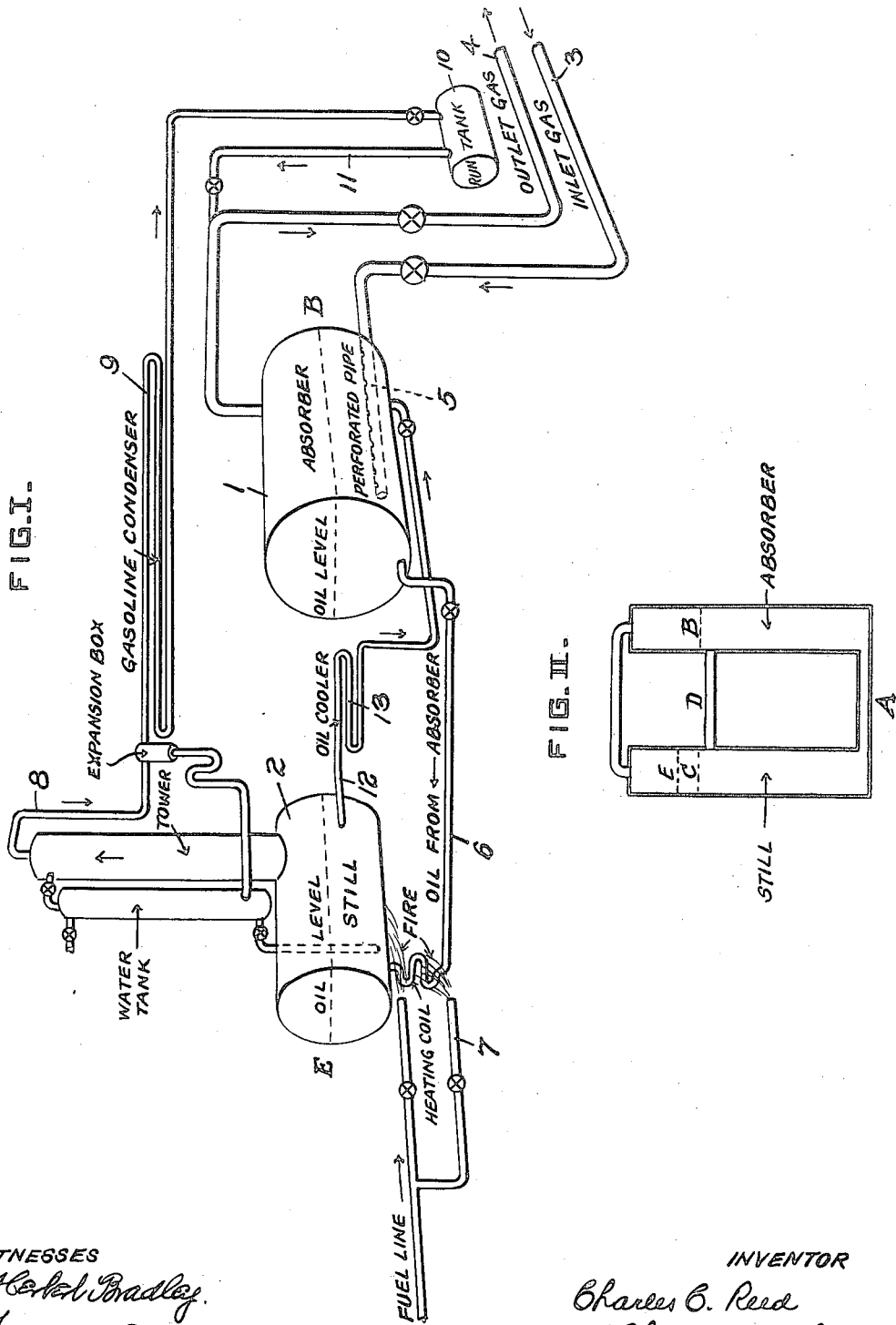

1,456,570

UNITED STATES PATENT OFFICE.

CHARLES C. REED, OF CLARKSBURG, WEST VIRGINIA, ASSIGNOR TO THE HOPE CONSTRUCTION AND REFINING COMPANY, OF PITTSBURGH, PENNSYLVANIA, A CORPORATION OF DELAWARE.

METHOD OF OPERATION EMPLOYED IN EXTRACTING LIQUID VAPOR FROM A GASEOUS CARRIER.

Application filed March 14, 1921. Serial No. 452,190.

*To all whom it may concern:*

Be it known that I, CHARLES C. REED, residing at Clarksburg, in the county of Harrison and State of West Virginia, a citizen of the United States, have invented or discovered certain new and useful Improvements in Methods of Operation Employed in Extracting Liquid Vapor from a Gaseous Carrier, of which improvements the following is a specification.

My invention relates to improvements in methods of and apparatus for recovering from a gaseous carrier a liquid borne (as is said) in vapor form; it finds practical application in the recovery of gasoline from natural gas.

In the recovery of gasoline from natural gas by the absorption process two elements or parts are necessarily present: an absorption chamber, wherein the gasoline-laden gas mingles with and gives up its burden to a body of absorbing material, commonly liquid. This body is commonly spoken of as the menstruum. The second of the two elements or parts alluded to is the still, into which the menstruum comes after it has absorbed the gasoline and where by fractional distillation the gasoline is carried away to the place of recovery. The unburdened menstruum is ordinary returned to the absorption chamber, to repeat in cyclic progress its essential office.

When the menstruum is so used over and over again repetitively, it is necessary to provide both for the advance of the gasoline-laden menstruum, from the absorption chamber to the still, and for the return of the menstruum, after it has given up its gasoline burden, from the still to the absorption chamber again; and the usual provision is found in a pump, driving the menstruum through a conduit. The flow in one direction may be under gas pressure or it may be by gravity, but (I am speaking now of the prior art) the return flow is effected by a pump; in some cases flow in both directions is pump-impelled.

My invention resides in and is achieved in consequence of an arrangement and disposition of parts, such that no such specially provided and specially operated machine part as a pump is required, but the desired flow of menstruum from absorption chamber to still and from still back again to absorption chamber continues in closed cycle automatically. As distinguished from a pump-impelled system of circulation mine may properly be termed a thermo-siphon system of circulation.

In the accompanying drawings Fig. I is a view in perspective and diagrammatic in character, showing a gasoline recovery plant in which my invention is embodied; Fig. II is a diagram illustrative of the principle of operation.

Referring first to Fig. I, an absorption chamber is shown at 1, and a still at 2. 3 is a gas inlet, through which the gasoline-laden gas approaches the absorption plant, and 4 is a gas outlet, through which the unburdened gas is led away. The gas advancing through the inlet pipe 3 escapes in finely divided state from the nozzle 5 and bubbles up through a pool of menstruum constantly maintained in absorption chamber 1. (It should have been explained initially that these plants ordinarily are built for continuous operation, and such is a characteristic of the plant here illustrated.) It is during this bubbling of the gas up through the pool of menstruum that the desired absorption takes place. From the absorption chamber the gas flows on, relieved of its burden of gasoline—relieved, that is to say to a substantial extent, at least—and passes on through pipe 4. The type of absorption chamber here shown and described is but one of various types known to the industry. I do not limit my invention to an absorber of this particular type; it is applicable to an absorber of any type, provided only that a pool of menstruum collects in the absorption chamber.

The menstruum, laden with the gasoline which it has absorbed, passes from absorption chamber 1 through conduit 6 to still chamber 2. There, in still chamber 2, heat being applied as by a burner 7, fractional distillation takes place, and gasoline vapors pass off through pipe 8. These vapors are condensed in a condenser 9 and the liquid gasoline is collected in tank 10. A pipe 11 carries uncondensed gases from tank 10 out from the absorption plant to pipe 4, to mingle in one stream with the gas flowing on from absorption chamber 1.

As I already have said, it is common to pump menstruum from the still back again to the absorption chamber; sometimes a pump is interposed between absorption chamber and still. It is of course understood that, in a system using the same body of menstruum over and over again, the menstruum ordinarily as it flows from absorber to still loaded with gasoline will not be loaded to the limit of its capacity, and further that the denuded menstruum flowing from still back again to absorption chamber will not be denuded to the utmost until absolutely freed of all trace of gasoline. The transfer under all practical conditions is such as will work to economic advantage.

In the practice of my invention I arrange absorption chamber and still chamber at a common level, that is, substantially so; and I carry the gasoline-laden menstruum from absorption chamber to still through a continuous conduit which leads from the pool of liquid in absorber 1 at the bottom, and opens the pool in still 2 at the bottom, so that the pools of liquid in the two chambers may stand at an approximately uniform level indicated in Fig. I by the line E—B. The level is not identically the same, for reasons which presently I shall explain. I provide further a return conduit 12, also closed from end to end, from still chamber to absorption chamber, and the characteristic of this return conduit is that it opens from the still chamber at a point beneath the level and intermediate the depth of the pool of menstruum which during operation is contained within the chamber, and above the level at which or the levels at which conduit 6 makes its connections.

Turning now to the diagram, Fig. II. Here are two vertically disposed receptacles for liquid connected at their bases through conduit A. In these receptacles a body of liquid rises in two columns to the common level C—B. Beneath the level C—B but at a higher level than conduit A is a second interconnecting conduit D. Suppose now the liquid in the left hand column be heated, and suppose that in consequence of heating the liquid in the left-hand column expands, so that the upper level rises from C to E. There can on this account be no disturbance of the equipoise in conduit A; the head of liquid at the ends of A is not changed by the expansion of the liquid in one column relatively to the other. The equipoise in conduit D, however, is disturbed; the effect of expansion of the liquid in the left-hand column is to increase the head at the left-hand end of conduit D, with no corresponding increase at the right-hand end. The effect is flow of liquid from left to right in conduit D, and, in consequence a corresponding flow from right to left in conduit A. If such temperature conditions be maintained—that is to say, so long as the liquid in the left-hand column is hotter than that in the right-hand column, the liquid will circulate. This illustrates the general principle of operation. Further study of this figure (Fig. II) will make plain the following: the connecting duct A need not be exactly at the bottom, nor need its connections with the two receptacles be at the same level, nor need the connections of conduit D with the two receptacles be at the same level; it is sufficient, first, that all four connections be at lower level than the common surface of the two pools in the two receptacles (an approximate common surface), and, second, that the opening from still (in which the liquid is relatively hot) through conduit D be at higher level than the opening of conduit A to the still. Those essential conditions being established, and the two pools being at the different temperatures indicated, there will be flow from absorber to still through conduit A and from still to absorber through conduit D.

Returning to the showing of Fig. I, 12 is the conduit which corresponds to the conduit D of Fig. II. It is requisite of it, that it lead from still chamber 2 at a point lower than level E but at an interval above the connections of conduits 6.

The conduit 12 as arranged in Figure I opens to absorber 1 at the bottom of the pool therein, and in this respect there is variation between the showing of Figure I (which illustrates an actual installation) and the diagrammatic showing of Figure II. Let it be noted however in this connection that the liquid flowing in conduit 12 immediately on passing from the pool in the still 2 and at the level at which it passes from this pool enters a cooler. Consequently, the liquid which flows in the conduit beyond the cooler and enters the pool in absorber 1 is cold liquid, of substantially uniform temperature with the liquid which constitutes the pool in absorber 1. Under these circumstances it matters not whether the point of entrance of the return conduit 12 into the pool in the absorber 1 be high or low. The only limitation here is that the opening of conduit 12 into the pool within the absorber shall not be higher than the level at which the conduit 12 leads from the pool in still 2—or, speaking exactly, not so greatly higher as to countervail against the difference in head due to difference in temperature, in consequence of which flow is established.

I find that the conditions of circulation which in the foregoing consideration of Fig. II have been demonstrated respecting a liquid of constant character, may be practically enjoyed even in this situation, when the gasoline laden stream flowing in conduit 6 is of less specific gravity than the unburdened menstruum flowing in conduit 12.

I find further, and herein is a further feature of my invention, that cooling means, diagrammatically indicated at 13 arranged in conduit 12 tend to accelerate flow. Correspondingly, heating means may advantageously be introduced in conduit 6, and and indeed in Fig. I I show conduit 6 extending through the flame of burner 7, to heat the menstruum as it approaches the still. It is common to cause the two streams flowing to and from the still to pass through a heat-exchanger, and this arrangement will be understood to be applicable if desired in the practice of my invention and the heat-exchanger when present may be supplemented with additional heating and cooling means, as may be desired.

As will be understood from what has gone before, the level E of the pool of menstruum in the still chamber is during operation slightly higher than the level B of the pool of menstruum in the absorption chamber.

Thus automatically, and without the use of pumps or of any equivalent propelling apparatus, the menstruum is caused to flow in closed cycle, taking up gasoline at one point and delivering it again at another; the conditions for effecting absorption and distillation in turn being sufficient to maintain flow.

It is further to be remarked of the practical working out of my invention that, not only is the desired circulation of menstruum automatically attained by those very conditions which attend recovery and separation of the gasoline, but, further, that the system to which my improvement has been applied automatically controls itself; there is no "running wild" of the conditions, when once they are established. A word of further explanation will make this plain. Suppose the system now explained to be in operation; whatever tendency may be present to bring about a wider and wider difference of temperature between still and absorber must express itself in acceleration of flow; but acceleration of flow tends to reduce such difference of temperature.

The invention manifestly requires the presence of an absorption chamber and a still chamber in which the menstruum gathers in pools of substantial depth, which pools shall stand at approximately the same level, and connecting conduits having the characteristics and including a cooler, as described; but otherwise the form of apparatus may be varied widely.

I claim as my invention:

In the recovery of gasoline from natural gas according to the absorption process, the method herein described of maintaining circulation between a pool of menstruum in an absorption chamber open for the escape of gas and a pool of heated menstruum in a still chamber open for the escape of gasoline vapor and through streams diverse in specific gravity, which consists in maintaining the two chambers at a common general level, leading the return pipe from the still out at a higher level than the point of ingress of the entrance pipe to the still, and cooling the return stream.

In testimony whereof I have hereunto set my hand.

CHARLES C. REED.

Witnesses:
  BAYARD H. CHRISTY,
  FRANCIS J. TOMASSON.